(12) United States Patent
Lee

(10) Patent No.: US 7,440,210 B1
(45) Date of Patent: Oct. 21, 2008

(54) SERVO WRITING A DISK DRIVE BY WRITING MULTI-BIT SYNC MARKS IN SPIRAL TRACKS FOR IMPROVED SERVO WRITING

(75) Inventor: Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 599 days.

(21) Appl. No.: 10/875,591

(22) Filed: Jun. 23, 2004

(51) Int. Cl.
G11B 5/09 (2006.01)
G11B 5/596 (2006.01)

(52) U.S. Cl. ............ 360/51; 360/48; 360/77.07
(58) Field of Classification Search ............ None
See application file for complete search history.

(56) References Cited

U.S. PATENT DOCUMENTS

| | | | |
|---|---|---|---|
| 5,430,661 A | 7/1995 | Fisher et al. | |
| 5,576,906 A | 11/1996 | Fisher et al. | |
| 5,583,712 A | 12/1996 | Brunelle | |
| 5,668,679 A * | 9/1997 | Swearingen et al. | 360/75 |
| 5,696,639 A | 12/1997 | Spurbeck et al. | |
| 5,754,352 A | 5/1998 | Behrens et al. | |
| 5,754,353 A | 5/1998 | Behrens et al. | |
| 5,761,212 A | 6/1998 | Foland, Jr. et al. | |
| 5,793,548 A | 8/1998 | Zook | |
| 5,831,888 A | 11/1998 | Glover | |
| 5,838,512 A | 11/1998 | Okazaki | |
| 5,917,670 A | 6/1999 | Scaramuzzo et al. | |
| 6,021,012 A | 2/2000 | Bang | |
| 6,023,386 A | 2/2000 | Reed et al. | |
| 6,069,499 A | 5/2000 | Cho et al. | |
| 6,091,564 A | 7/2000 | Codilian et al. | |
| 6,101,229 A | 8/2000 | Glover | |
| 6,181,506 B1 | 1/2001 | Shimura et al. | |
| 6,191,906 B1 | 2/2001 | Buch | |
| 6,249,395 B1 | 6/2001 | Conway | |
| 6,249,896 B1 | 6/2001 | Ho et al. | |
| 6,272,194 B1 | 8/2001 | Sakamoto | |
| 6,292,318 B1 * | 9/2001 | Hayashi | 360/48 |
| 6,304,407 B1 | 10/2001 | Baker et al. | |
| 6,366,225 B1 | 4/2002 | Ozdemir | |
| 6,411,452 B1 | 6/2002 | Cloke | |
| 6,411,453 B1 | 6/2002 | Chainer et al. | |
| 6,429,989 B1 | 8/2002 | Schultz et al. | |
| 6,487,032 B1 | 11/2002 | Cloke et al. | |
| 6,507,450 B1 | 1/2003 | Elliott | |
| 6,519,107 B1 | 2/2003 | Ehrlich et al. | |
| 6,587,293 B1 | 7/2003 | Ding et al. | |

(Continued)

Primary Examiner—Joseph Feild
Assistant Examiner—Daniell L Negrón
(74) Attorney, Agent, or Firm—Howard H. Sheerin, Esq.

(57) ABSTRACT

A method of writing spiral tracks on a disk of a disk drive is disclosed. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. A write clock is synchronized to the rotation of the disk, and a plurality of spiral tracks are written on the disk at a predetermined circular location determined from the write clock. Each spiral track comprises a high frequency signal interrupted at a predetermined interval by a multi-bit sync mark, and each multi-bit sync mark comprises a plurality of bits.

10 Claims, 14 Drawing Sheets

U.S. PATENT DOCUMENTS

| | | |
|---|---|---|
| 6,603,622 B1 | 8/2003 | Christiansen et al. |
| 6,704,156 B1 | 3/2004 | Baker et al. |
| 6,738,205 B1 | 5/2004 | Moran et al. |
| 6,765,748 B2 * | 7/2004 | Shu .................. 360/77.04 |
| 6,771,443 B2 | 8/2004 | Szita et al. |
| 6,791,777 B2 | 9/2004 | Watanabe et al. |
| 6,882,486 B1 | 4/2005 | Kupferman |
| 6,943,978 B1 | 9/2005 | Lee |
| 6,965,489 B1 | 11/2005 | Lee et al. |
| 6,967,799 B1 | 11/2005 | Lee |
| 6,985,316 B1 | 1/2006 | Liikanen et al. |
| 6,987,636 B1 | 1/2006 | Chue et al. |
| 6,989,954 B1 | 1/2006 | Lee et al. |
| 7,002,761 B1 | 2/2006 | Sutardja et al. |
| 7,016,134 B1 | 3/2006 | Agarwal et al. |
| 7,023,631 B2 | 4/2006 | Zhang et al. |
| 7,027,247 B2 | 4/2006 | Heydari et al. |
| 7,054,083 B2 | 5/2006 | Ehrlich |
| 7,068,461 B1 | 6/2006 | Chue et al. |
| 7,088,533 B1 * | 8/2006 | Shepherd et al. .............. 360/51 |
| 7,212,364 B1 | 5/2007 | Lee |
| 2001/0010604 A1 | 8/2001 | Esumi |
| 2003/0030929 A1 | 2/2003 | Ozdemir |

* cited by examiner

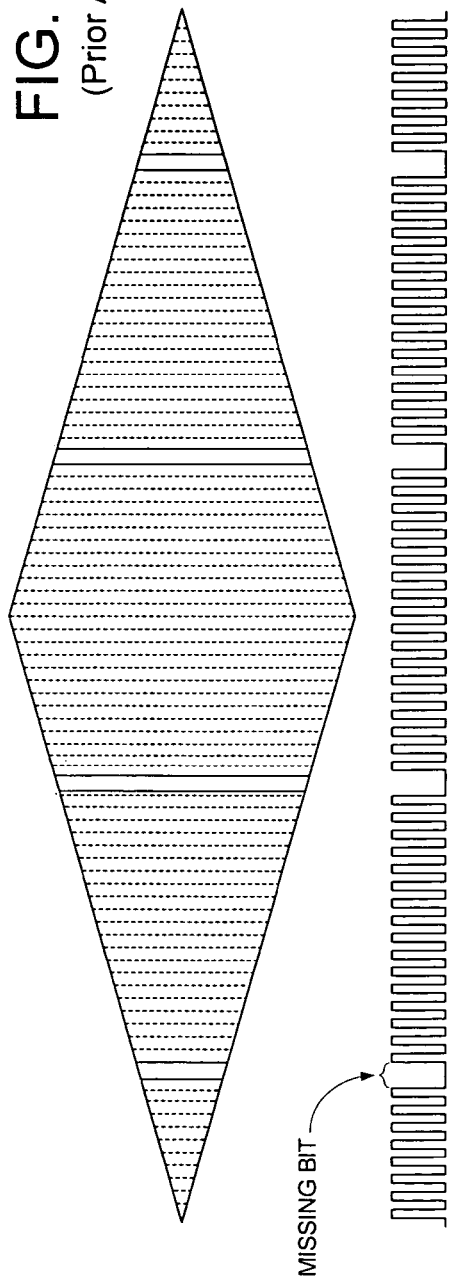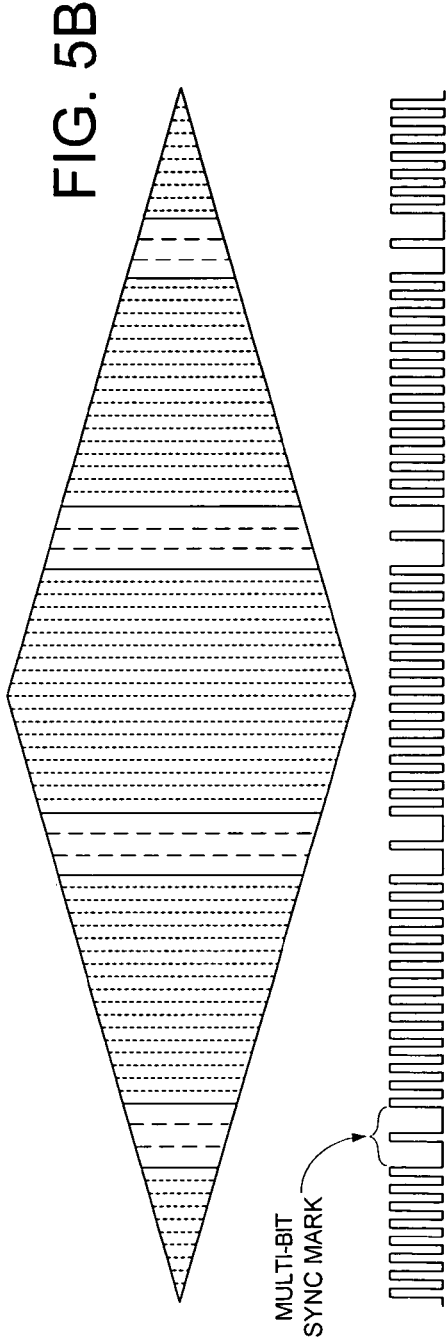

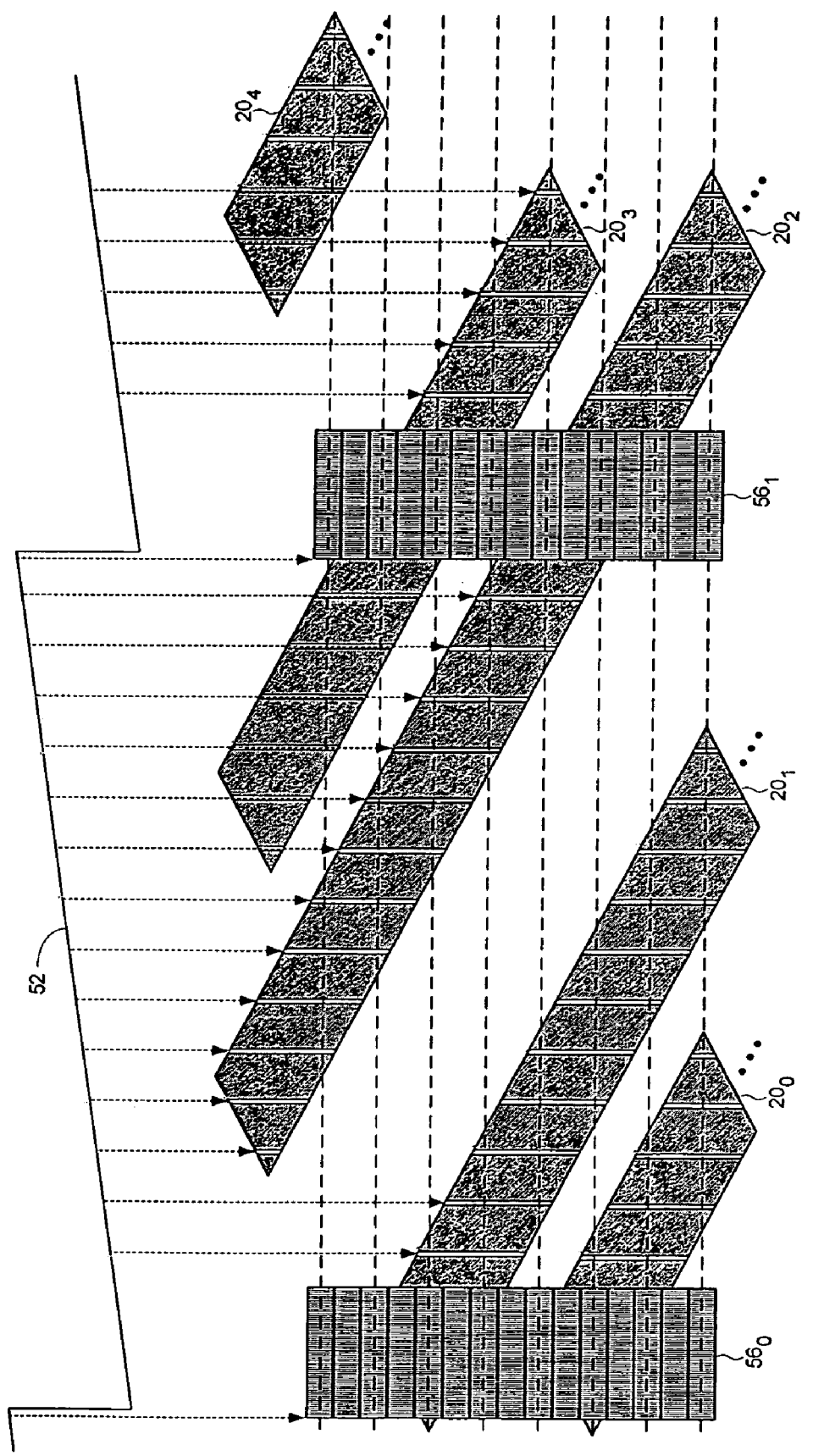

SERVO WRITING A DISK DRIVE BY WRITING MULTI-BIT SYNC MARKS IN SPIRAL TRACKS FOR IMPROVED SERVO WRITING

CROSS REFERENCE TO RELATED APPLICATIONS AND PATENTS

This application is related to other co-pending U.S. patent applications including Ser. No. 10/769,387 entitled "USING AN EXTERNAL SPIRAL SERVO WRITER TO WRITE REFERENCE SERVO SECTORS AND SPIRAL TRACKS TO A DISK TO FACILITATE WRITING PRODUCT SERVO SECTORS TO THE DISK" filed on Jan. 30, 2004, Ser. No. 10/769,680 entitled "SERVO WRITING A DISK DRIVE BY SYNCHRONIZING A SERVO WRITE CLOCK TO A HIGH FREQUENCY SIGNAL IN A SPIRAL TRACK" filed on Jan. 30, 2004, and Ser. No. 10/769,386 entitled "SERVO WRITING A DISK DRIVE BY SYNCHRONIZING A SERVO WRITE CLOCK IN RESPONSE TO A SYNC MARK RELIABILITY METRIC" filed on Jan. 31, 2004, the disclosures of which are incorporated herein by reference.

BACKGROUND OF THE INVENTION

1. Field of the Invention

The present invention relates to disk drives. More particularly, the present invention relates to servo writing a disk drive by writing multi-bit sync marks in spiral tracks for improved servo writing.

2. Description of the Prior Art

When manufacturing a disk drive, product servo sectors $2_0$-$2_N$ are written to a disk 4 which define a plurality of radially-spaced, concentric data tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the missing bits are detected using a retrigerable 1-shot that detects the presence of a longer gap in the read signal. However, the retrigerable one-shot may falsely detect a missing bit and/or skip over a missing bit due to noise in the read signal, thereby inducing timing errors in the servo write clock PLL.

There is, therefore, a need to improve the detection of sync marks written in spiral tracks to facilitate synchronizing a servo write clock used to servo write a disk drive.

SUMMARY OF THE INVENTION

The present invention may be regarded as a method of writing spiral tracks on a disk of a disk drive. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. A write clock is synchronized to the rotation of the disk, and a plurality of spiral tracks are written on the disk at a predetermined circular location determined from the write clock. Each spiral track comprises a high frequency signal interrupted at a predetermined interval by a multi-bit sync mark, and each multi-bit sync mark comprises a plurality of bits.

In one embodiment, the head inside the HDA is used to write the spiral tracks on the disk, and in one embodiment, an external servo writer is used to write the spiral tracks on the disk.

The present invention may also be regarded as a method of writing product servo sectors on a disk of a disk drive. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a plurality of spiral tracks, wherein each spiral track comprises a high frequency signal interrupted at a predetermined interval by a multi-bit sync mark. The head internal to the disk drive is used to read the spiral tracks to generate a read signal which is sampled to generate a sequence of read signal sample values. A timing recovery measurement is generated in response to the read signal sample values, and synchronous sample values are generated in response to the timing recovery measurement. The multi-bit sync mark in the spiral tracks is detected from the synchronous sample values to generate a sync mark detect signal. A servo write clock is synchronized in response to the sync mark detect signal, and the servo write clock and the head internal to the disk drive are used to write the product servo sectors to the disk.

In one embodiment, the timing recovery measurement is generated in response to the high frequency signal in the spiral tracks.

In another embodiment, the step of detecting the multi-bit sync mark comprises the step of evaluating the synchronous sample values in context to detect an estimated sequence. In one embodiment, the estimated sequence is correlated with a target sequence corresponding to the multi-bit sync mark.

The present invention may also be regarded as a disk drive comprising a disk having a plurality of spiral tracks, wherein each spiral track comprises a high frequency signal interrupted at a predetermined interval by a multi-bit sync mark. A head coupled to a distal end of an actuator arm is rotated about a pivot by a voice coil motor to position the head radially over the disk. The head internal to the disk drive is used to read the spiral tracks to generate a read signal which is sampled to generate a sequence of read signal sample values. A timing recovery measurement is generated in response to the read signal sample values, and synchronous sample values are generated in response to the timing recovery measurement. The multi-bit sync mark in the spiral tracks is detected from the synchronous sample values to generate a sync mark detect signal, and a servo write clock is synchronized in response to the sync mark detect signal. The servo write clock and the head internal to the disk drive are used to write the product servo sectors to the disk.

BRIEF DESCRIPTION OF THE DRAWINGS

FIG. 5A shows a prior art format of an eye pattern generated by reading a spiral track that comprises a single-bit sync mark.

FIG. 5B shows an eye pattern according to an embodiment of the present invention generated by reading the spiral track, including the multi-bit sync marks.

FIG. 6 illustrates writing of product servo sectors using a servo write clock generated from reading the spiral tracks.

DESCRIPTION OF THE PREFERRED EMBODIMENTS

Figure 2B:
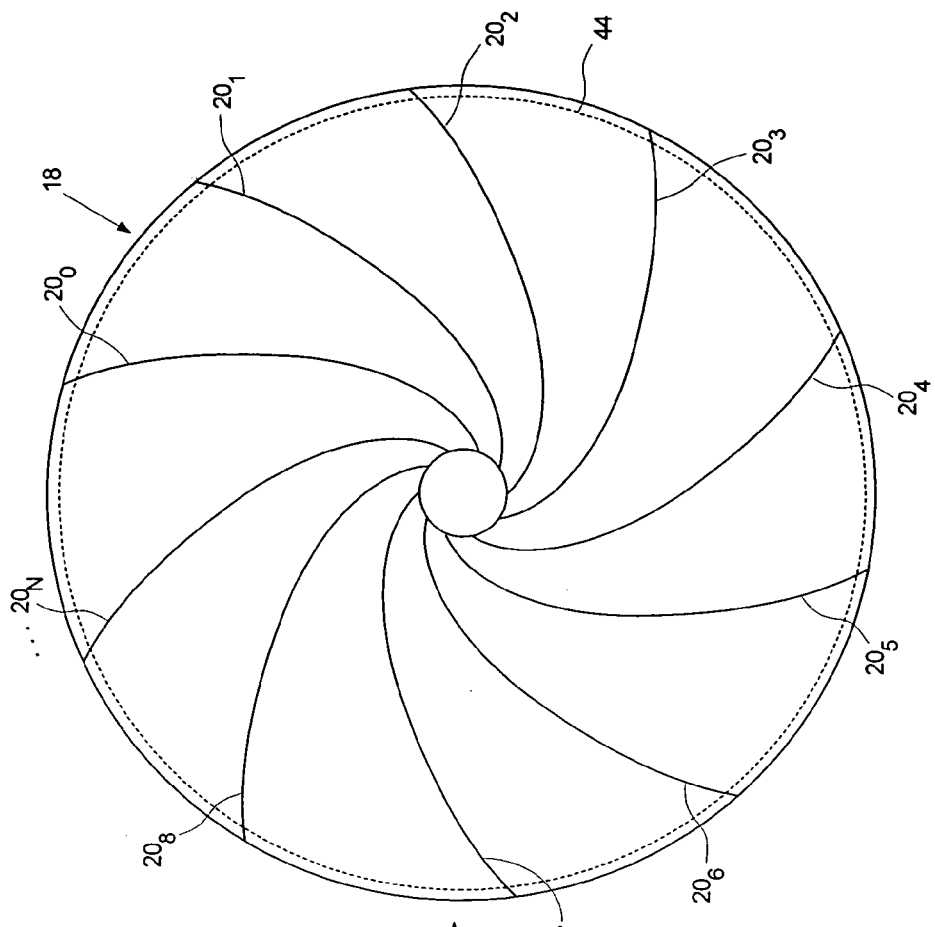
FIGS. 2A and 2B illustrate an embodiment of the present invention wherein an external spiral servo writer is used to write a plurality of spiral tracks to the disk for use in writing product servo sectors to the disk.
Figure 2A:
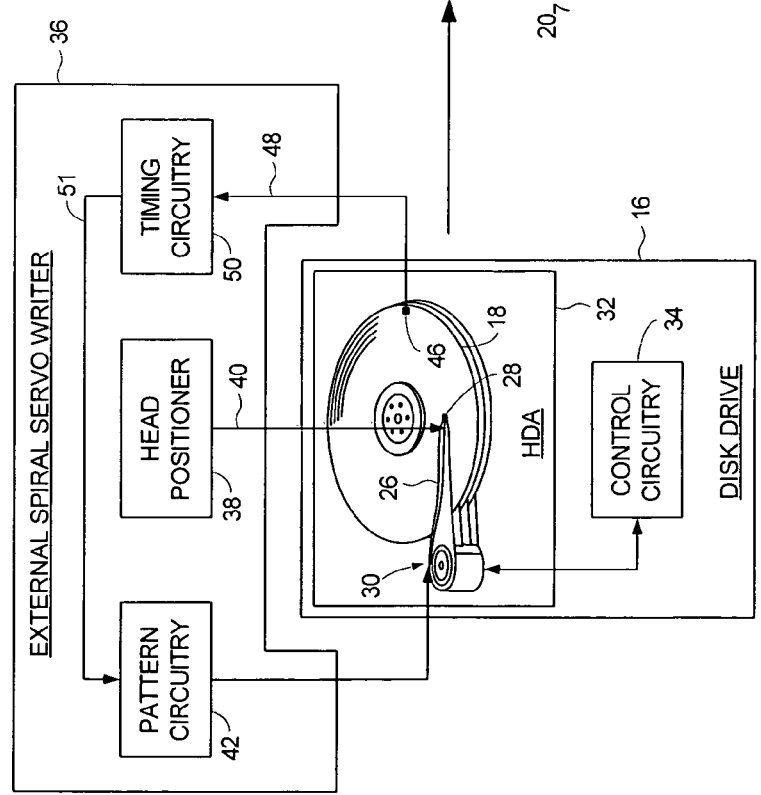

FIGS. 2A and 2B show a technique according to an embodiment of the present invention for writing spiral tracks on a disk 18 of a disk drive 16. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and a plurality of spiral tracks $20_0$-$20_N$ are written on the disk 18 at a predetermined circular location determined from the write clock. Each spiral track $20_i$ comprises a high frequency signal 22 (FIG. 5B) interrupted at a predetermined interval by a multi-bit sync mark 24, and each multi-bit sync mark 24 comprises a plurality of bits.

In one embodiment, the control circuitry 34 writes the spiral tracks $20_0$-$20_N$ to the disk 18 and then processes the spiral tracks $20_0$-$20_N$ to write the product servo sectors to the disk 18. In the embodiment shown in FIG. 2A, an external servo writer 36 is used to write the spiral tracks $20_0$-$20_N$ to the disk 18. The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the multi-bit sync marks 24 (FIG. 4B) within the spiral tracks $20_0$-$20_N$ at the same circular location from the outer diameter to the inner diameter of the disk 18. As described below with reference to FIG. 6, the constant interval between multi-bit sync marks 24 (independent of the radial location of the head 28) enables the servo write clock to maintain synchronization while writing the product servo sectors to the disk.

Figure 3:
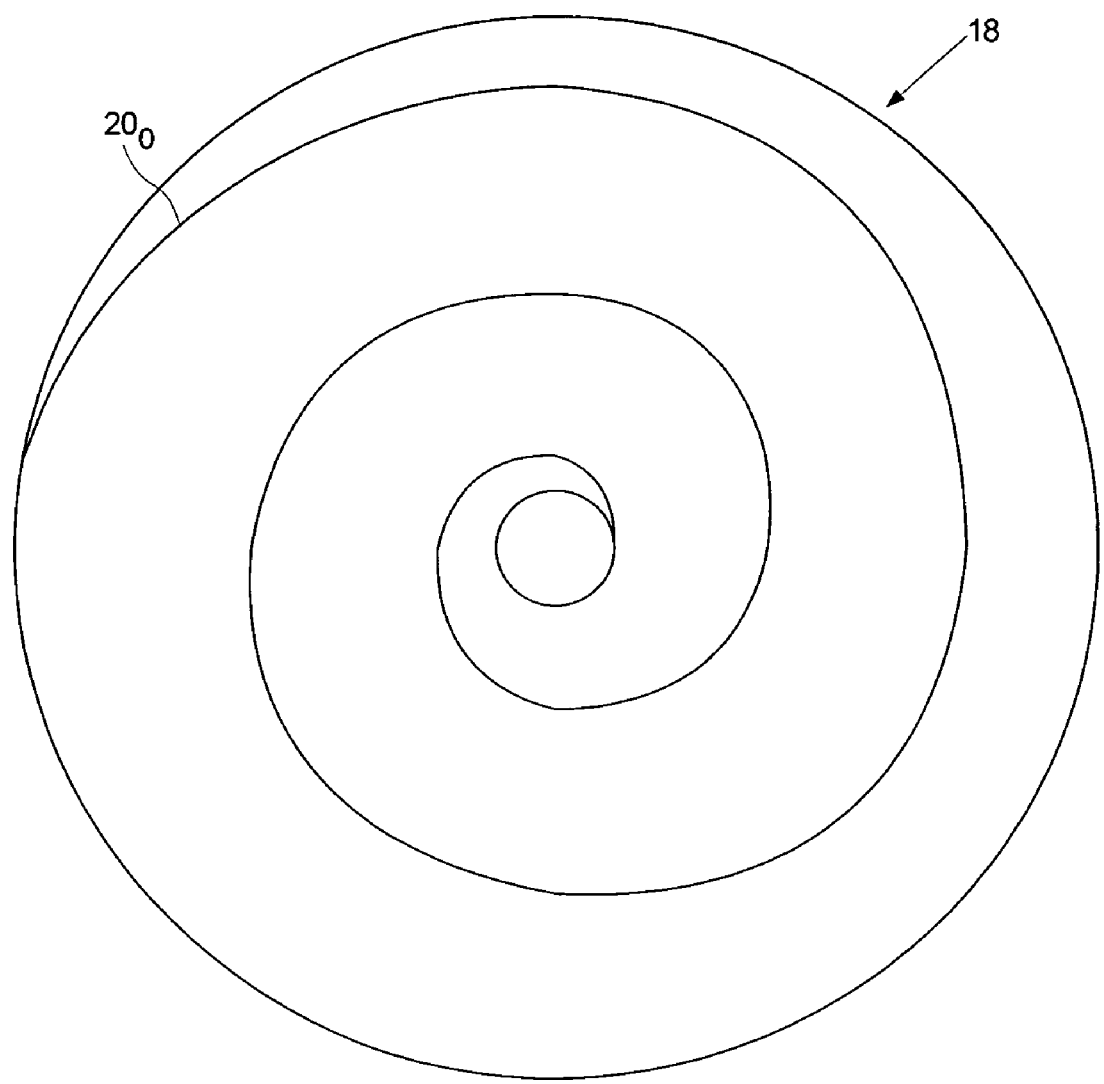
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each discontinuous spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 12 and 13, an external product servo writer is used to process the spiral tracks $20_0$-$20_N$ in order to write the product servo sectors to the disk 18 during a "fill operation".

Figure 4A:
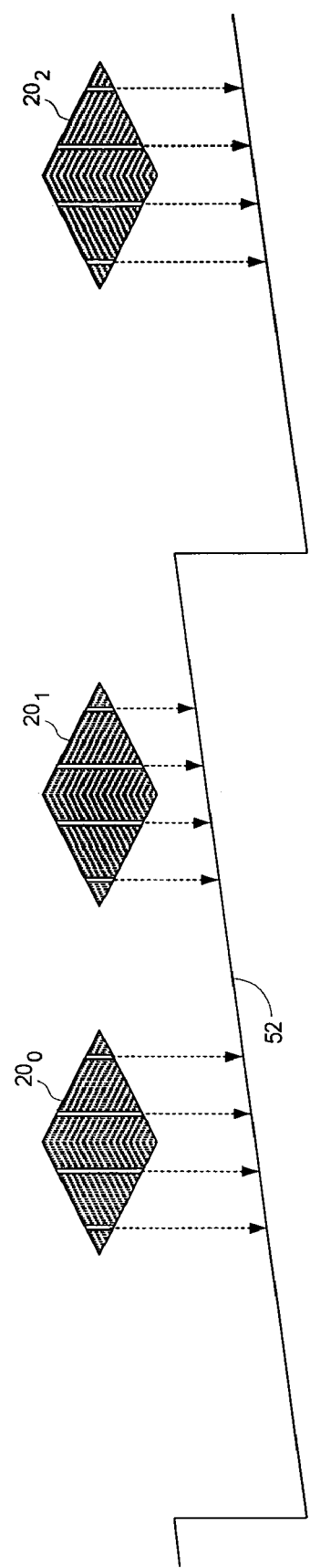
FIG. 4A shows an embodiment of the present invention wherein a servo write clock is synchronized by clocking a modulo-N counter relative to when the multi-bit sync marks in the spiral tracks are detected.
Figure 4B:
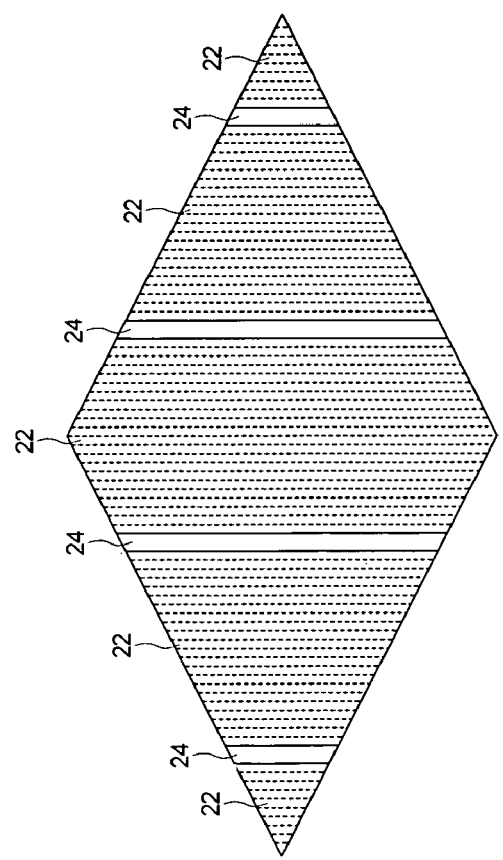
FIG. 4B shows an eye pattern generated by reading the spiral track, including the multi-bit sync marks in the spiral track.

FIG. 4B illustrates an "eye" pattern in the read signal that is generated when the head 28 passes over a spiral track 20. The read signal representing the spiral track comprises high frequency transitions 22 interrupted by multi-bit sync marks 24. When the head 28 moves in the radial direction, the eye pattern will shift (left or right) while the multi-bit sync marks 24 remain fixed. The shift in the eye pattern (detected from the high frequency signal 22) relative to the multi-bit sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the multi-bit sync marks 24 in the spiral tracks $20_0$-$20_N$ are detected at a target modulo-N count value. The servo write clock may be generated using any suitable circuitry, such as a phase locked loop (PLL). As each multi-bit sync mark 24 in the spiral tracks $20_0$-$20_N$ is detected, the value of the modulo-N counter represents the phase error for adjusting the PLL. In one embodiment, the PLL is updated when any one of the multi-bit sync marks 24 within the eye pattern is detected. In this manner the multiple multi-bit sync marks 24 in each eye pattern (each spiral track crossing) provides redundancy so that the PLL is still updated if one or more of the multi-bit sync marks 24 are missed due to noise in the read signal. Once the multi-bit sync marks 24 are detected at the target modulo-N count values, the servo write clock is coarsely locked to the desired frequency for writing the product servo sectors to the disk 18.

The multi-bit sync marks 24 in the spiral tracks $20_0$-$20_N$ comprise a plurality of bits which increases the detection accuracy as compared to the prior art "missing bit" sync mark. In addition, as described below with reference to FIG. 11, in one embodiment synchronous sample values are generated from the read signal and the multi-bit sync marks 24 detected from the synchronous sample values using, for example, a Viterbi sequence detector. The multi-bit sync marks 24 may comprise any suitable sequence, such as the sequence "010" shown in FIG. 5B as compared to the prior art "missing bit" sync mark shown in FIG. 5A. In one embodiment, the multi-bit sync marks 24 comprise a sequence that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

FIG. 6 illustrates how the product servo sectors $56_0$-$56_N$ are written to the disk 18 after synchronizing the servo write clock in response to the high frequency signal 22 and the multi-bit sync marks 24 in the spiral tracks $20_0$-$20_N$. In the embodiment of FIG. 6, the dashed lines represent the centerlines of the data tracks. The sync marks in the spiral tracks $20_0$-$20_N$ are written so that there is a shift of two multi-bit sync marks 24 in the eye pattern (FIG. 4B) between data tracks. In an alternative embodiment, the multi-bit sync marks 24 in the spiral tracks $20_0$-$20_N$ are written so that there is a shift of N sync marks in the eye pattern between data tracks. In the embodiment of FIG. 6, each spiral track $20_0$-$20_N$ is wider than a data track, however, in an alternative embodiment the width of each spiral track $20_0$-$20_N$ is less than or proximate the width of a data track.

Figure 1:
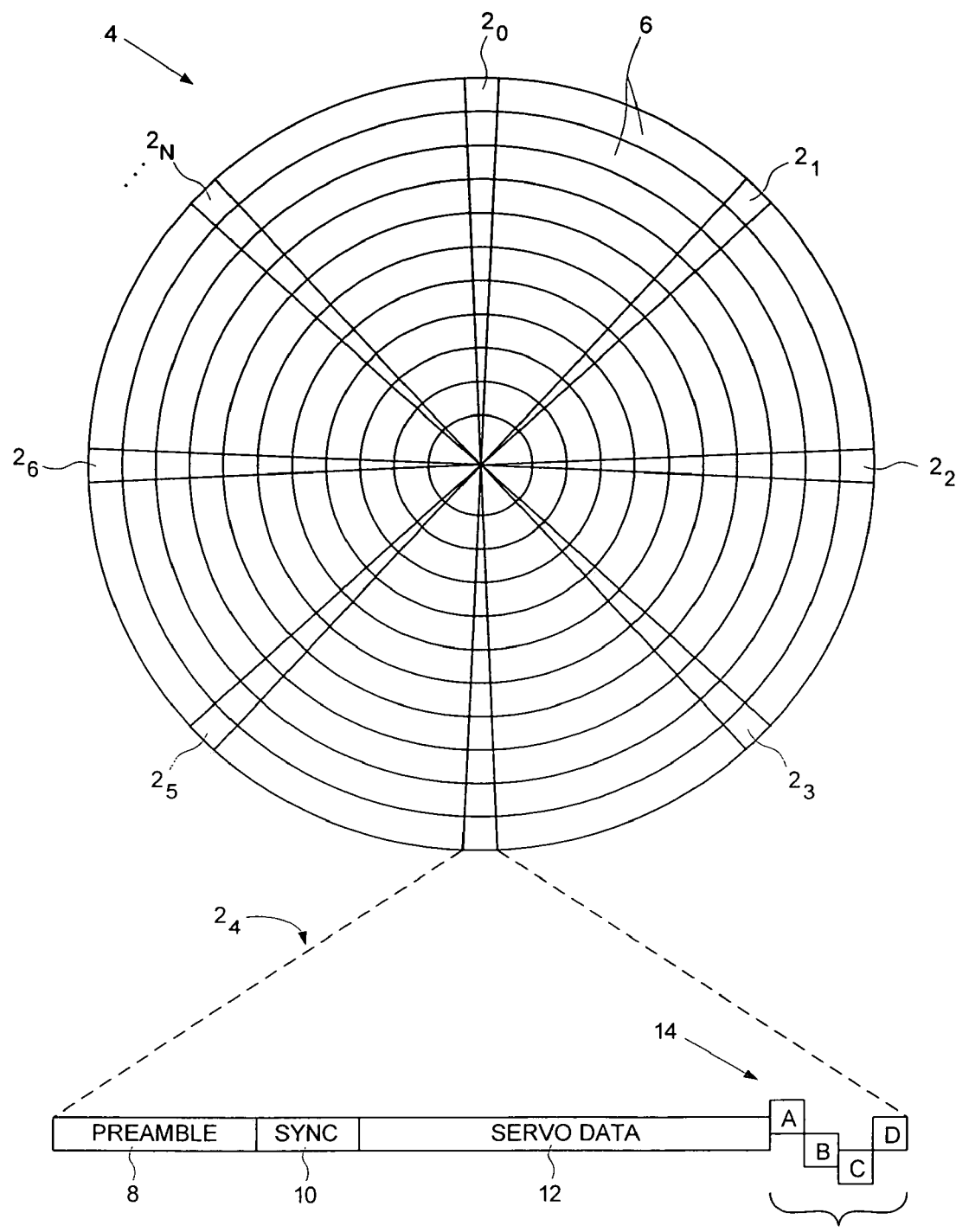
FIG. 1 shows a prior art disk format comprising a plurality of radially spaced, concentric tracks defined by a plurality of product servo sectors.

The PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the conventional product servo sectors (FIG. 1).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track 203 is processed to generate the PES tracking error and the timing recovery measurement.

Figure 7:
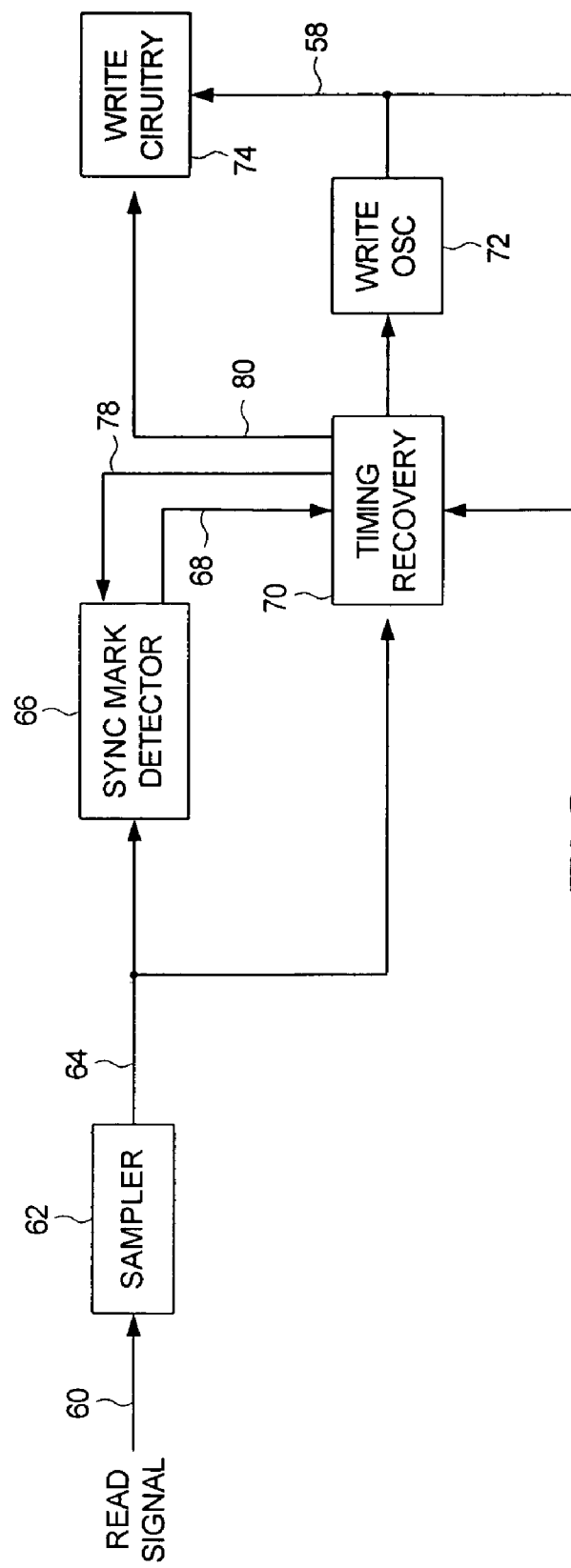
FIG. 7 shows circuitry according to an embodiment of the present invention for generating the servo write clock including a sync detector for detecting the multi-bit sync marks in the spiral tracks and timing recovery for adjusting the frequency of a write oscillator.

FIG. 7 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the multi-bit sync marks 24 in the spiral tracks $20_0$-$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$-$20_N$ to generate a fine timing recovery measurement. The coarse and fine timing recovery measurements are combined to generate a control signal applied to a write oscillator 72 which outputs the servo write clock 58. The servo write clock 58 clocks operation of write circuitry 74 for writing the product servo sectors $56_0$-$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 8:
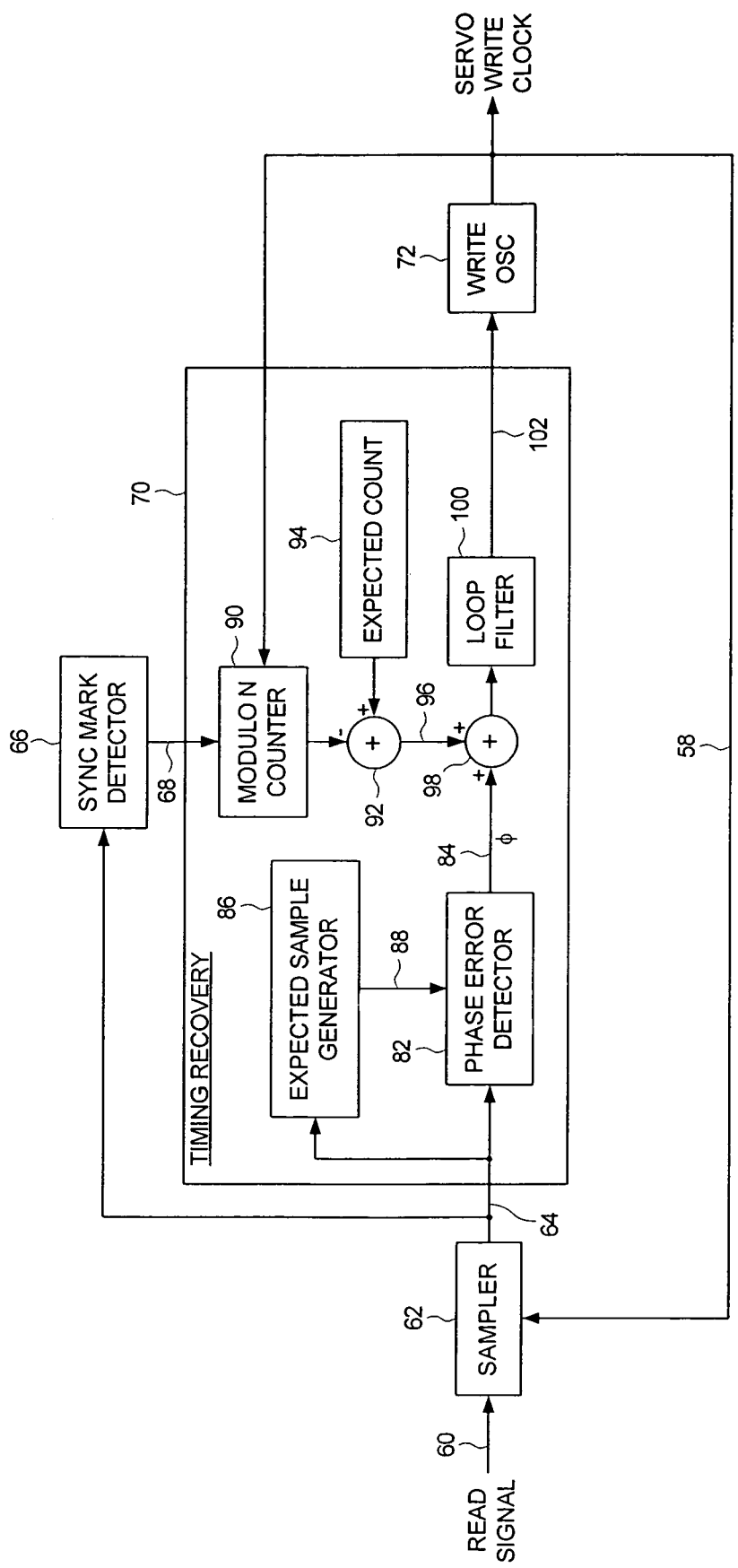
FIG. 8 shows an embodiment of the timing recovery circuitry wherein a fine phase error is generated from read signal sample values and expected sample values, and the servo write clock is used to synchronously sample the read signal.
Figure 9:
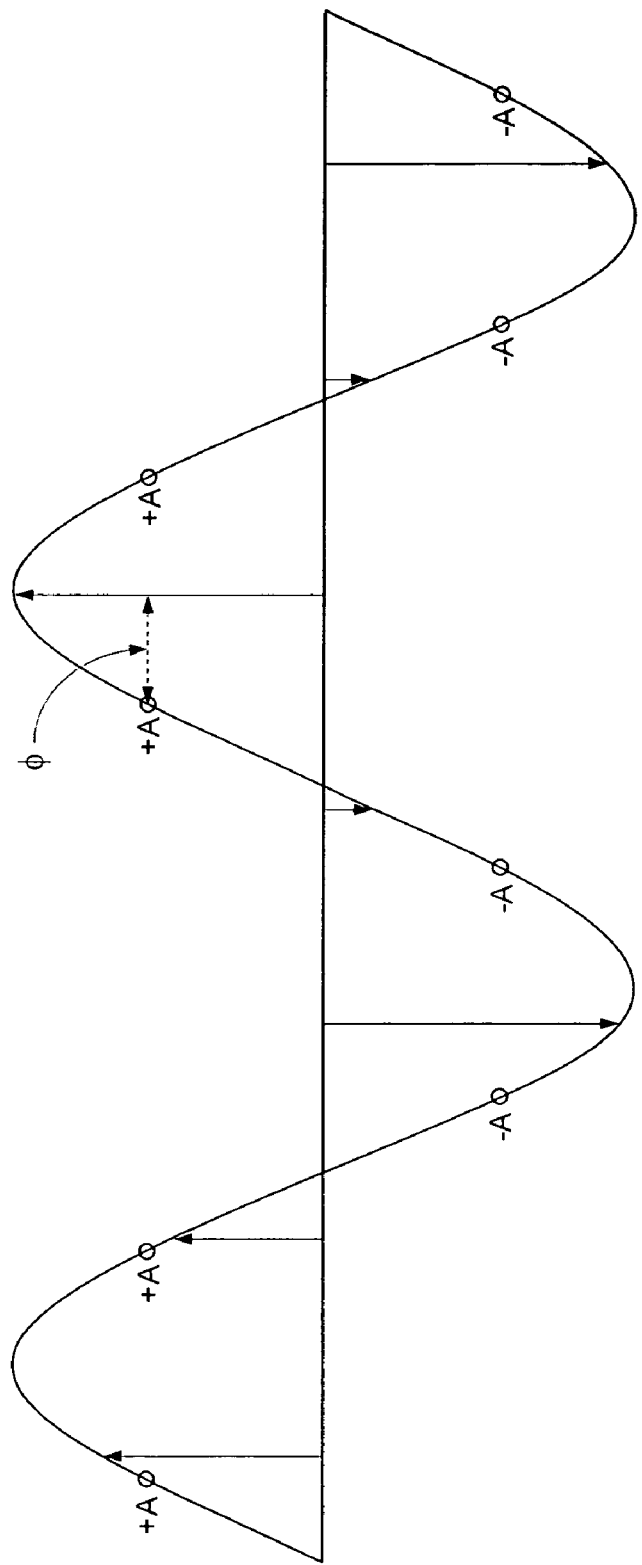
FIG. 9 illustrates the read signal sample values, the expected sample values, and the corresponding phase error.

FIG. 8 shows details of a suitable timing recovery circuit 70 according to an embodiment of the present invention wherein the servo write clock 58 is used to synchronously sample 62 the read signal 60 to generate synchronous read signal sample values 64. A phase error detector 82 detects a phase error □84 between the read signal sample values 64 (arrows in FIG. 9) and expected sample values 88 (circles in FIG. 9). An expected sample generator 86 generates the expected sample values 88 input into the phase error detector 82. The phase error detector 82 generates the phase error □84 by implementing a suitable stochastic gradient equation. In one embodiment, the expected sample generator 86 processes the read signal samples 64 to initialize a state machine which then outputs the expected sample values 88. Referring to FIG. 9, after being initialized the state machine generates the sequence ( . . . +A, +A, −A, −A, +A, +A, −A, −A . . . ). In one embodiment, a high bandwidth gain loop maintains the gain of the read signal sample values 64 at a target level to compensate for the amplitude variation in the read signal 60 (the eye pattern of FIG. 4B) as the head 28 passes over a spiral track 20. In an alternative embodiment, the amplitude A of the expected sample values 88 is adjusted relative to the amplitude of the read signal 60. For example, an envelope detector can track the amplitude of the eye pattern (FIG. 4B) and then adjust the amplitude A of the expected sample values 88 accordingly. However, any suitable technique may be used to generate the fine timing recovery measurement (phase error □) from the high frequency signal 22 in the spiral tracks 20. In one embodiment, a suitable trigonometric identity is employed to generate the phase error □ in a manner that is substantially independent of the amplitude variations in the read signal 60.

The servo write clock 58 also clocks a modulo N counter 90 (FIG. 8). When the sync mark detector 66 detects a sync mark 24 in a spiral track 20, the content of the modulo N counter 90 is subtracted 92 from an expected count value 94 to generate the coarse timing recovery measurement 96. The coarse timing recovery measurement 96 and the fine timing recovery measurement (phase error □84) are combined 98 and filtered by a loop filter 100. The output of the loop filter 100 is a frequency control signal 102 applied to the write oscillator 72 in order to synchronize the servo write clock 58.

Figure 10:
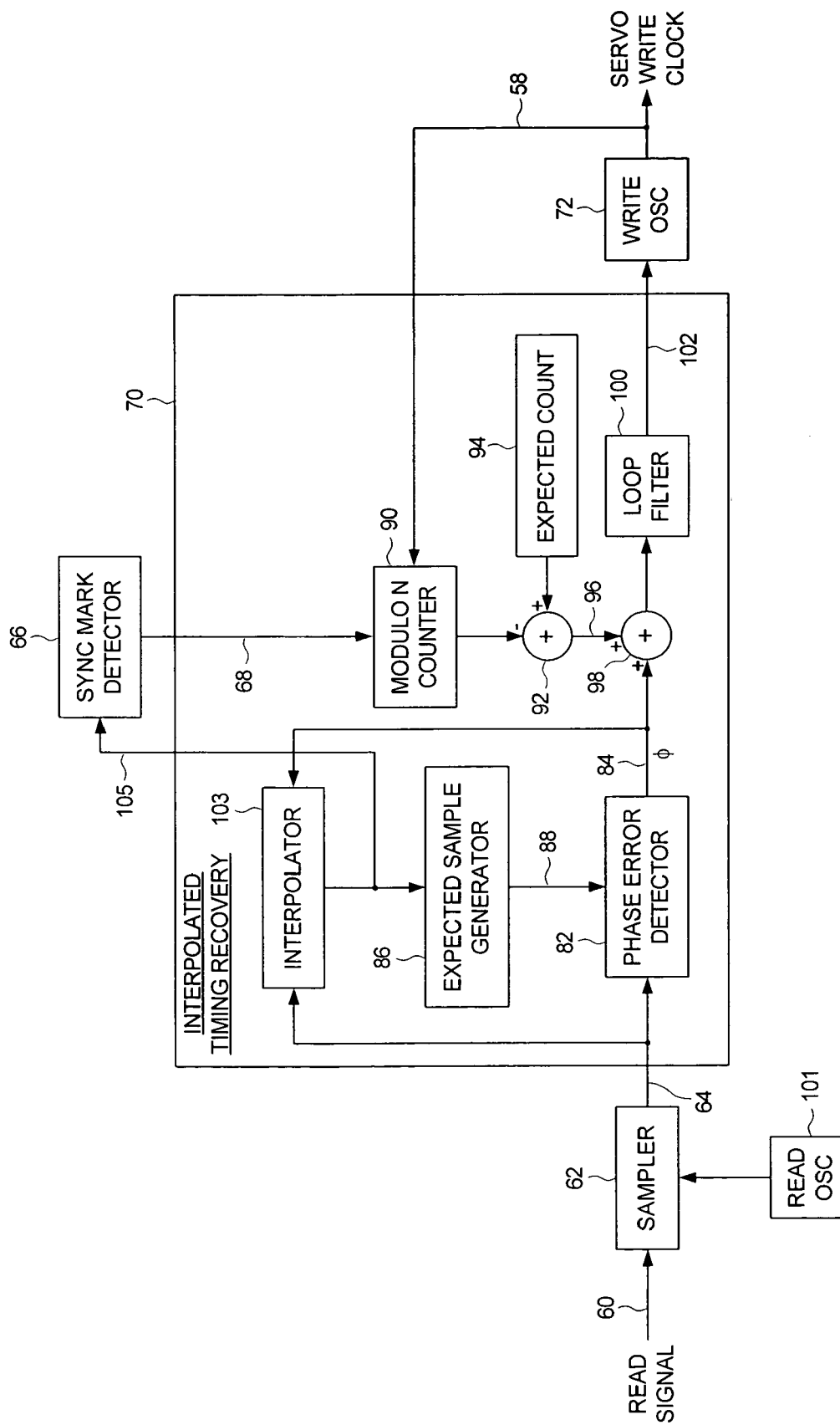
FIG. 10 shows an alternative embodiment wherein the timing recovery circuitry comprises an interpolator and a read oscillator is used to sample the read signal.

FIG. 10 shows details of a timing recovery circuit 70 according to an alternative embodiment of the present invention employing interpolated timing recovery (ITR). A read oscillator 101 samples 62 the reads signal 60 at a constant frequency to generate asynchronous sample values 64. A phase error detector 82 generates a phase error □84 between the expected sample values 88 and the asynchronous sample values 64. An interpolator 103 interpolates the asynchronous sample values 64 using the phase error □84 to generate synchronous sample values 105 processed by the sync mark detector 66 and the expected sample value generator 86. The interpolator 103 may employ any suitable circuitry, and in one embodiment implements a finite impulse response filter with variable coefficients for performing the interpolation. The remaining components in the timing recovery circuit 70 of FIG. 10 operate as described above with reference to FIG. 8 to generate a frequency control signal 102 applied to the write oscillator 72 in order to synchronize the servo write clock 58. In one embodiment, the read oscillator 101 and the write oscillator 72 are implemented on the same substrate so that they exhibit substantially the same center frequency and temperature drift.

Figure 11:
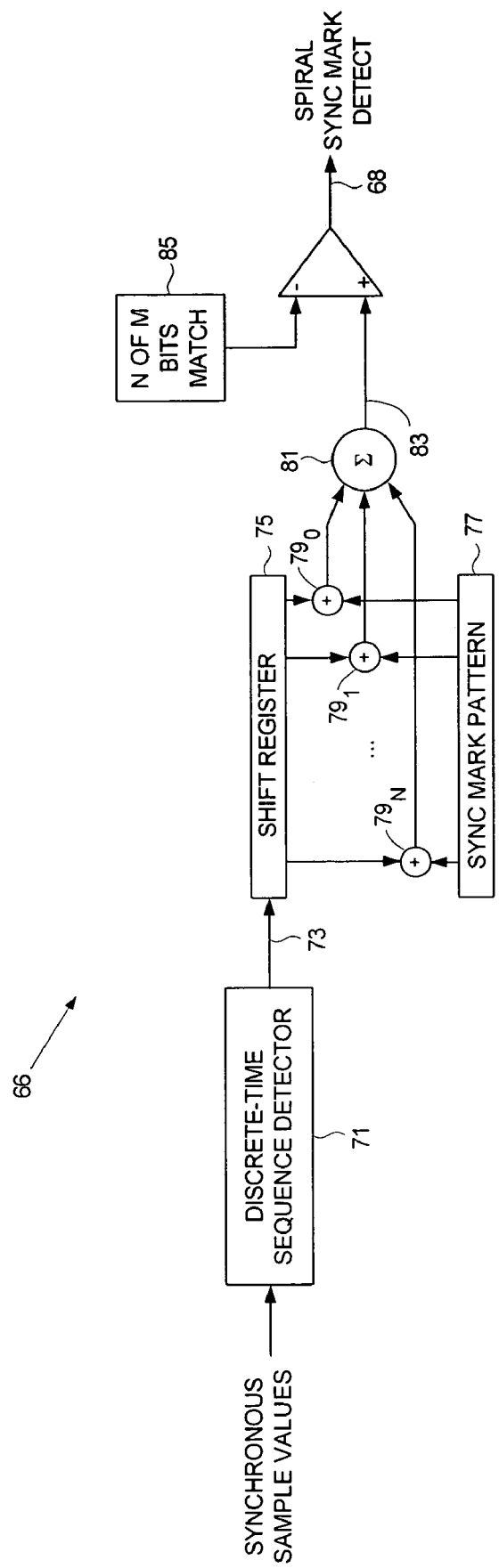
FIG. 11 shows components of the control circuitry for detecting the multi-bit sync marks, including a discrete-time sequence detector (e.g., a Viterbi sequence detector) and a correlator for correlating an estimated sequence with a target sequence.

The sync mark detector 66 may be implemented using any suitable circuitry. FIG. 11 shows an embodiment of the sync mark detector 66 as comprising a discrete-time sequence detector 71 for detecting an estimated sequence 73 from the synchronous sample values. For example, in one embodiment the discrete time sequence detector 71 comprises a Viterbi sequence detector for detecting the estimated sequence 73 after suitable partial response equalizing. In the embodiment of FIG. 11, the estimated sequence 73 is correlated with a target sequence corresponding to the multi-bit sync mark 24. The estimated sequence 73 is shifted into shift register 75 and correlated using a plurality of XOR circuits $79_0$-$79_N$ with the target sequence stored in register 77. The outputs of the XOR circuits $79_0$-$79_N$ are summed 81, and the resulting correlation 83 compared to a threshold 85. If the correlation 83 exceeds the threshold 85 (N of M bits match), then the sync mark detect signal 68 is activated. In one embodiment, the estimated sequence 73 output by the discrete-time sequence detector 71 as well as the target sequence 77 comprise binary values. In an alternative embodiment, the estimated sequence 73 and target sequence 77 comprise multi-bit signed values representing the synchronous sample values.

Figure 12:
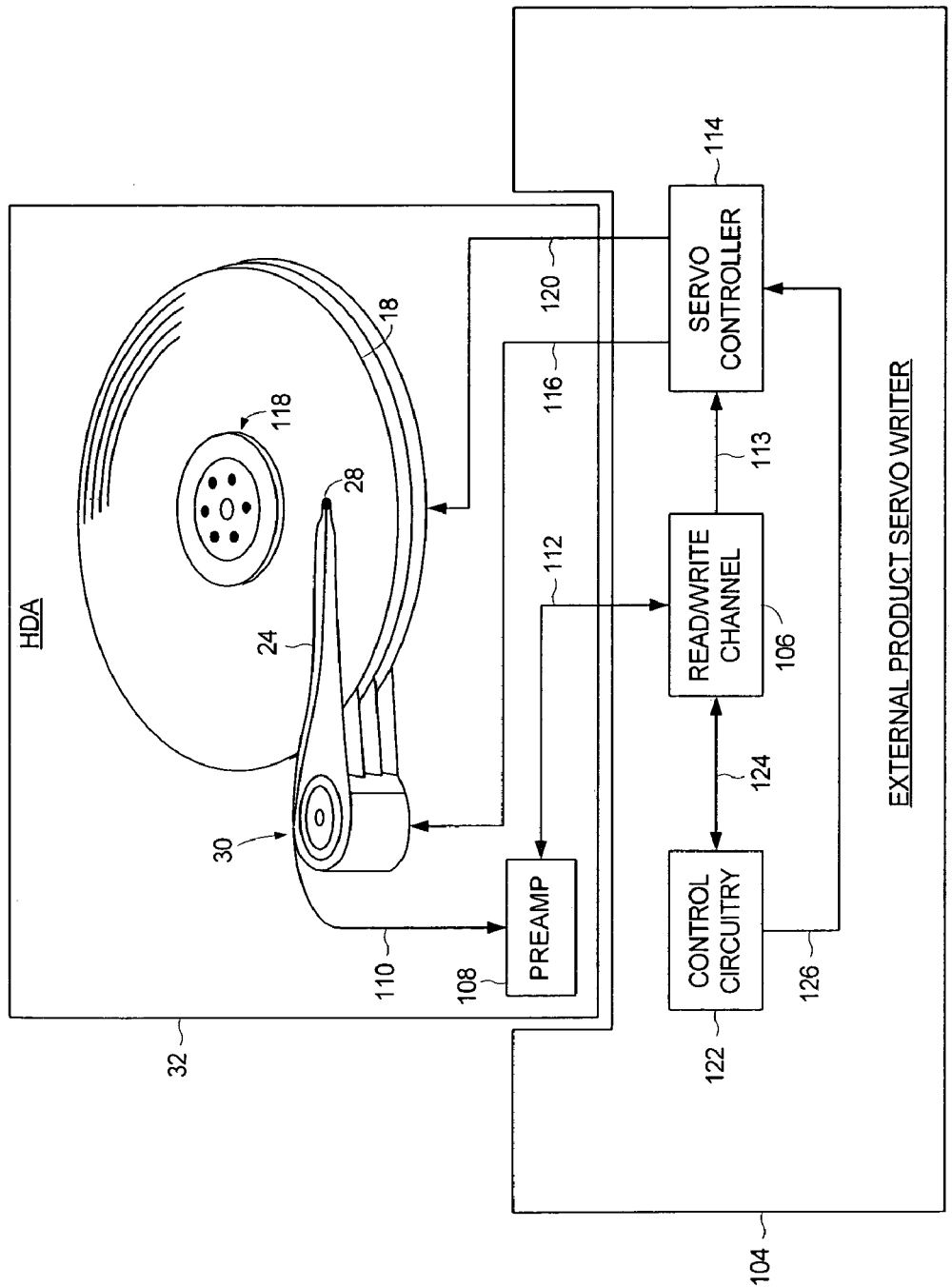
FIG. 12 shows an embodiment of the present invention wherein an external product servo writer is used to process the spiral tracks in order to write the product servo sectors to the disk.
Figure 13:
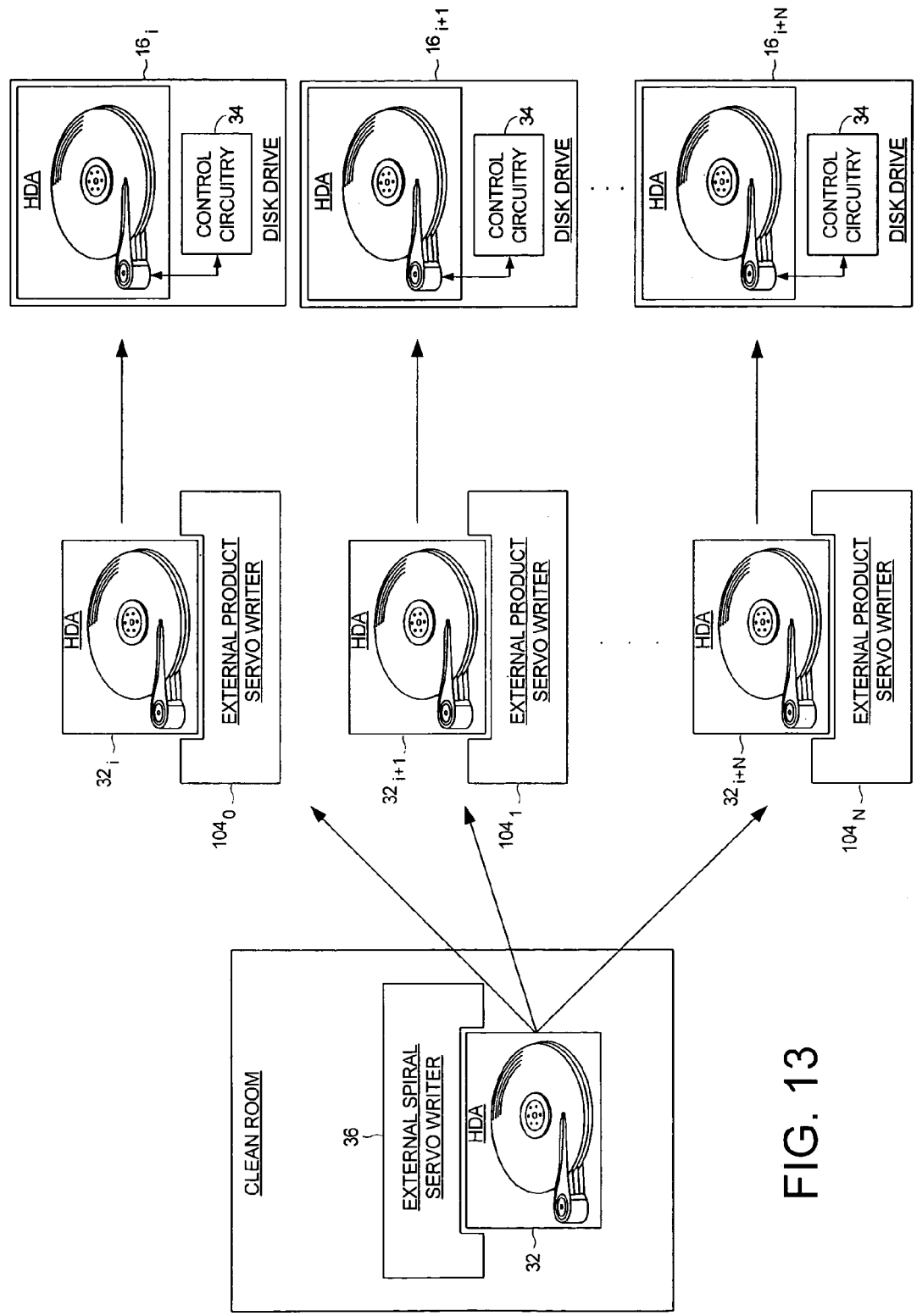
FIG. 13 shows an embodiment of the present invention wherein an external spiral servo writer is used to write the spiral tracks, and a plurality of external product servo writers write the product servo sectors for the HDAs output by the external spiral servo writer.

FIG. 12 shows an embodiment of the present invention wherein after writing the spiral tracks $20_0$-$20_N$ to the disk 18 (FIGS. 2A-2B), the HDA 32 is inserted into an external product servo writer 104 comprising suitable circuitry for reading and processing the spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 14:
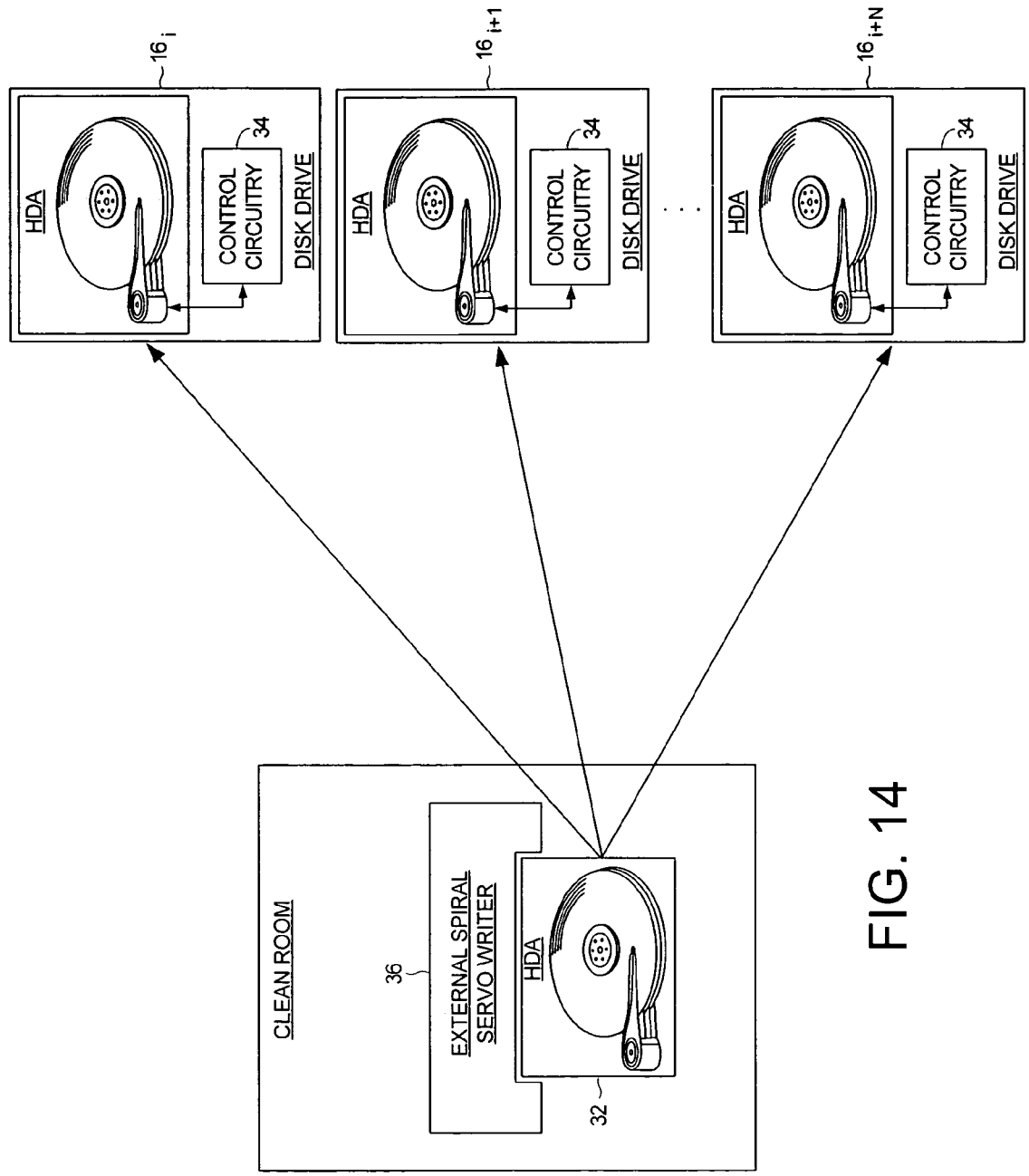
FIG. 14 shows an embodiment of the present invention wherein an external spiral servo writer is used to write the spiral tracks, and the control circuitry within each product disk drive is used to write the product servo sectors.

In one embodiment, the external product servo writer 104 of FIG. 12 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 13, a plurality of external product servo writers $104_0$-$104_N$ process the HDAs $32_{i-i+N}$ output by an external spiral servo writer 36 in order to write the product servo sectors less expensively and more efficiently than a conventional servo writer. In an alternative embodiment shown in FIG. 14, an external spiral servo writer 36 is used to write the spiral tracks, and the control circuitry 34 within each product disk drive $16_0$-$16_N$ is used to write the product servo sectors.

I claim:

1. A method of writing spiral tracks on a disk of a disk drive using an external servo writer, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the method comprising the steps of:
   (a) synchronizing a write clock to the rotation of the disk; and
   (b) writing a plurality of spiral tracks on the disk at a predetermined circular location determined from the write clock, wherein:
      each spiral track comprises a high frequency signal interrupted at a predetermined interval by a multi-bit sync mark; and
      each multi-bit sync mark comprises a plurality of bits.

2. A method of writing product servo sectors on a disk of a disk drive, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a multi-bit sync mark, the method comprising the steps of:
   (a) using the head internal to the disk drive to read the spiral tracks to generate a read signal;
   (b) sampling the read signal to generate a sequence of read signal sample values;
   (c) generating a timing recovery measurement in response to the read signal sample values;
   (d) generating synchronous sample values in response to the timing recovery measurement;
   (e) detecting the multi-bit sync mark in the spiral tracks from the synchronous sample values to generate a sync mark detect signal;
   (f) synchronizing a servo write clock in response to the sync mark detect signal; and
   (g) using the servo write clock and the head internal to the disk drive to write the product servo sectors to the disk.

3. The method as recited in claim 2, wherein the timing recovery measurement is generated in response to the high frequency signal in the spiral tracks.

4. The method as recited in claim 2, wherein the step of detecting the multi-bit sync mark comprises the step of evaluating the synchronous sample values in context to detect an estimated sequence.

5. The method as recited in claim 4, wherein the step of detecting the multi-bit sync mark further comprises the step of correlating the estimated sequence with a target sequence corresponding to the multi-bit sync mark.

6. A disk drive comprising:
   (a) a disk comprising a plurality of spiral tracks, wherein each spiral track comprises a high frequency signal interrupted at a predetermined interval by a multi-bit sync mark;
   (b) an actuator arm;
   (c) a head coupled to a distal end of the actuator arm;
   (d) a voice coil motor for rotating the actuator arm about a pivot to position the head radially over the disk; and
   (e) control circuitry for writing a plurality of product servo sectors to the disk to define a plurality of radially spaced, concentric data tracks by:
      using the head internal to the disk drive to read the spiral tracks to generate a read signal;
      sampling the read signal to generate a sequence of read signal sample values;
      generating a timing recovery measurement in response to the read signal sample values;
      generating synchronous sample values in response to the timing recovery measurement;
      detecting the multi-bit sync mark in the spiral tracks from the synchronous sample values to generate a sync mark detect signal;
      synchronizing a servo write clock in response to the sync mark detect signal; and
      using the servo write clock and the head internal to the disk drive to write the product servo sectors to the disk.

7. The disk drive as recited in claim 6, wherein the timing recovery measurement is generated in response to the high frequency signal in the spiral tracks.

8. The disk drive as recited in claim 6, wherein the control circuitry comprises a discrete-time sequence detector for detecting the multi-bit sync marks by evaluating the synchronous sample values in context to detect an estimated sequence.

9. The disk drive as recited in claim 8, wherein the discrete-time sequence detector comprises a Viterbi sequence detector.

10. The disk drive as recited in claim 8, wherein the control circuitry comprises a correlator for correlating the estimated sequence with a target sequence corresponding to the multi-bit sync mark.

* * * * *